United States Patent [19]

Foerster et al.

[11] 4,194,904

[45] Mar. 25, 1980

[54] PRODUCTION OF PURIFIED LEAD AND ANTIMONY OXIDE

[75] Inventors: George S. Foerster, Hightstown; Harold A. Stuhler, Brown Mills, both of N.J.

[73] Assignee: N L Industries, Inc., New York, N.Y.

[21] Appl. No.: 931,284

[22] Filed: Aug. 4, 1978

[51] Int. Cl.² ........................................... C22B 13/06
[52] U.S. Cl. ......................................... 75/78; 75/24; 75/63; 75/69; 423/88; 423/617
[58] Field of Search .................... 75/24, 69, 78, 63; 423/88, 617

[56] References Cited

U.S. PATENT DOCUMENTS 1,726,346  8/1929  Gonser et al. ........................... 75/24

FOREIGN PATENT DOCUMENTS 447451  5/1936  United Kingdom ........................ 75/78

*Primary Examiner*—M. J. Andrews
*Attorney, Agent, or Firm*—Gerald K. White

[57] ABSTRACT

Purified lead and antimony oxide are produced from antimonial lead alloys by oxidation of the molten alloy to form purified metallic lead and a slag of lead oxides and antimony oxides, separation of the metal and slag, and subsequent partial reduction and fuming of the slag to produce pure antimony oxide.

7 Claims, 1 Drawing Figure

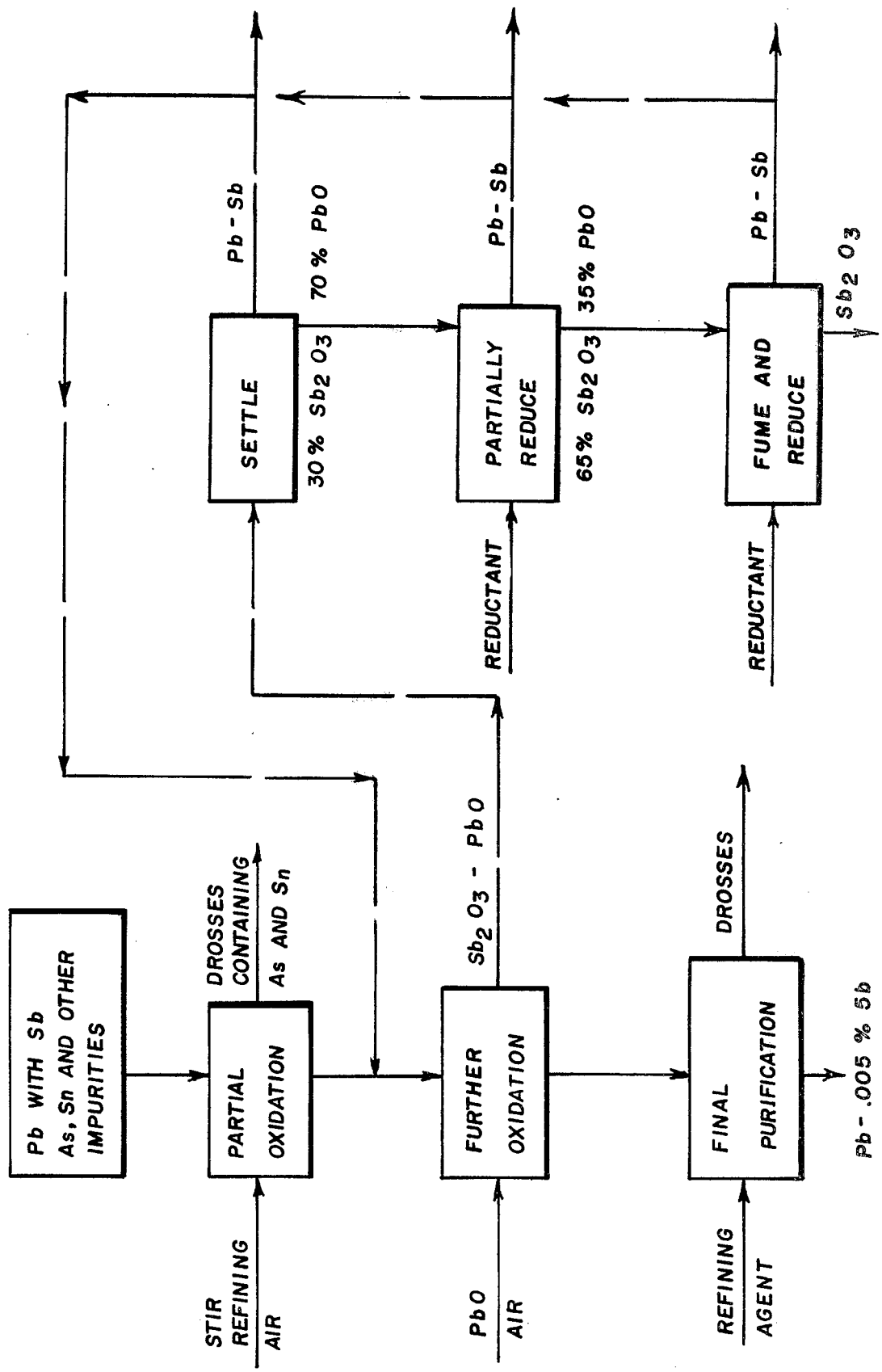

PRODUCTION OF PURIFIED LEAD AND ANTIMONY OXIDE

This invention generally pertains to the production of purified lead and antimony oxide from lead-antimony alloys through controlled preferential oxidation of the alloy to produce purified lead and a lead oxide-antimony oxide slag, separation of the lead and slag, and subsequent partial reduction and fuming of the slag to form antimony oxide. This invention has special significance at the present time because of the availability of large quantities of lead antimony scrap which must be ultimately processed to lead battery grid alloys containing little antimony. Hence, an efficient technique for removal and reclamation of the excess antimony content is of substantial significance to the secondary lead industry.

The purification or softening of lead alloyed with antimony with use of various oxidation techniques is well known in the art as exemplified by U.S. Pat. Nos. 50,800; 786,581; 1,640,486; 1,640,487; 1,950,388; 2,062,838; and 3,335,569. In addition, it is well known in the art to produce various forms of antimony oxide by fuming techniques such as shown in U.S. Pat. Nos. 1,504,685; 1,534,743; 1,726,346; 2,035,453; 2,035,454; 2,177,551; 2,278,134; and 2,062,838; and in French Pat. No. 1,491,728. In addition, aforesaid U.S. Pat. No. 2,062,838 produces lead and antimony oxide by a technique considered to be significantly different and less efficient than that of this invention. The ability to efficiently produce both materials is extremely desirable in view of the current availability of large quantities of antimonial lead scrap from storage batteries.

The process of the invention starts with a feed material comprising a lead alloy containing substantial amounts of antimony, e.g. about 0.1 to 10 weight percent, and small amounts of contaminant materials such as arsenic and tin which are typically present in amounts of about 0.5 percent. Other typical contaminants include copper and sulfur. It is desirable but not essential to remove such contaminant metals by partial oxidation of the lead alloy. Since both arsenic and tin oxidize preferentially to both the lead and antimony, the alloy can be purified by an initial oxidation which develops a powdery dross containing the oxides of tin and arsenic. This reaction goes readily and in many cases simply stirring the alloy in an air atmosphere will be sufficient to produce the dross. If the arsenic level is not reduced to the desired level, it can be reduced further by the addition of other agents, as is known in the art. The removal of arsenic can be accomplished as a first step and the dross removed before oxidation of the antimony as shown in the sole FIGURE. Alternatively, the oxidation can be a single stage and the arsenic and tin dross removed as a prelude to producing antimony oxide rich slag.

In accordance with the process of this invention, the lead-antimony alloy is oxidized to form purified lead containing a maximum of about 0.1% antimony and a relatively high antimony slag, e.g., typically on the order of 30 weight percent antimony oxide, balance essentially lead oxide. Upon separation of the lead and slag, a preferential reduction of the lead oxide in the slag is effected, thereby increasing its antimony oxide content to from about 40 to 80 weight percent. Simultaneous fuming and additional preferential reduction are then conducted to maintain the desired antimony oxide content and thereby produce high quality antimony trioxide at high efficiencies. Lead containing small quantities of antimony is formed during the reduction reactions and may be removed continuously or permitted to accumulate and removed periodically.

The sole FIGURE is a schematic representation of a suitable embodiment of the overall process of the invention.

The lead-antimony alloy, following arsenic and tin removal, is subjected to partial oxidation whereupon the antimony is preferentially oxidized to form antimony trioxide. This step may be typically accomplished by bubbling air through the molten alloy to directly oxidize the antimony. Air is bubbled through the metal in as large a quantity as possible without ejecting material or entraining material in the air stream. This typically causes surface agitation which assists in the oxidation. The molten alloy is maintained at a relatively high temperature, e.g., about 1200° F. to 1800° F., to increase the rate of oxidation. When the antimony level of the molten alloy reaches about 0.1%, the slag is removed.

An alternate oxidation technique comprises stirring litharge (PbO) into the molten alloy at a temperature on the order of 1200° F. until the fluid black slag commences to thicken. At this point the antimony content of the molten alloy is approximately 0.1% and the antimony trioxide content of the slag is from about 20% to 40%. The slag is then separated from the molten alloy.

The separated lead has an antimony content of about 0.1% and may be further purified if desired by methods well known to those skilled in the art.

Following its separation from the purified lead, slag from the oxidation step is cooled to a temperature sufficient to solidify the slag, e.g., about 950° F. Any lead entrained on the slag remains molten and can be poured off.

Reduction of the slag containing a high concentration of antimony trioxide is accomplished through partial reduction with the addition of a reductant such as carbon black, carbon monoxide, graphite, coal fines or petroleum coke. The reductant is added in an amount sufficient to reduce much of the lead oxide but little of the antimony trioxide. A slag rich in antimony trioxide is produced, along with lead metal which contains a small amount of antimony and settles to the bottom of the container. The partial reduction of the slag increases the concentration of the antimony oxide in the slag from about 20% to 40% antimony oxide to from about 40% to 80%. Antimony oxide contents in excess of about 80% lead to the formation of undesirable grey colored fumes and thus should be avoided. On the other hand, antimony oxide contents below about 40% should be avoided because of yellowing and low fuming rates. At such increased antimony trioxide concentrations, the slag readily fumes off antimony trioxide. Accordingly, after the antimony oxide level of the slag has been increased the desired amount, the temperature of the slag is adjusted to a point where the antimony trioxide fumes at the desired rate. Because the vapor pressures of antimony trioxide and lead oxide are very different, the enriched slag compositions can be fumed easily at 1400° F. to 1800° F. with negligible amounts of lead oxide contained in the fume. It is preferred to use a fuming temperature of about 1500° F. to 1700° F. to optimize fuming rate and color. This temperature is especially compatible with slag containing about 60% to 70% antmony oxide. The fumed antimony oxide may be collected by simply passing a carrier gas across the surface of the slag and passing into suitable collection apparatus.

In accordance with the invention, as the slag starts fuming, additional reductant is added to offset the build-up of lead oxide in the slag and to maintain the concentration of antimony trioxide between about 40% to 80%, which maintains rapid and easy fuming. It is preferred to maintain the concentration between about 60% and 70% to optimize fuming rate and color. Although adequate fuming rates may be obtained at slag temperatures of on the order of 1250° F., it is preferred to maintain the slag at a temperature in excess of about 1400° F. to further maximize fume production. Slag temperatures in excess of about 1800° F. lead to fume discoloration and should be avoided. As the antimony trioxide fumes, lead oxide builds up in the slag. The addition of reductant during fuming reduces this lead oxide by reducing it to lead metal which sinks to the bottom and does not fume. Accordingly, in the present invention additional reductant is added during fuming in an amount to control the lead oxide build-up in the slag and prevent fuming of lead oxide. In accordance with the present invention substantially all of the slag can be fumed and processed and the heel of lead metal produced, which contains a minor amount of antimony, e.g., about 5%, may be recycled to the initial oxidation step, if desired, or used directly.

The recovery of antimony, in the form of antimony trioxide, is essentially 95 percent overall of the starting quantity of antimony metal and typically is about 90% per cycle. A substantial advantage of the present process is that the energy requirement to recover the antimony trioxide is substantially less than required for processes which reduce antimony oxide to the metal and them fume the metal.

The following example illustrates a typical manner of practicing the invention.

A lead-antimony alloy melt was treated by known methods to produce a softening slag containing 70% PbO, 30% $Sb_2O_3$ with negligible amounts of tin and arsenic. A sample of the slag weighing 200 pounds was melted with about 1 pound of coke in a vessel. Additional coke, about 5 pounds, was added as the charge was heated to about 1550° to 1600°. The melt was maintained at this temperature until the reaction was essentially completed. Pb metal containing about 5% antimony was formed and collected at the bottom. Analysis of the slag indicated that the $Sb_2O_3$ content was 60-65% by weight. A carrier gas was blown across the melt surface to sweep away the $Sb_2O_3$ vapor. The hot gas was cooled to about 200° F. and the condensed $Sb_2O_3$ was collected in a baghouse. Samples of the $Sb_2O_3$ fume were found to be white and to contain less than 0.1% Pb. Small amounts of coke were added periodically to the melt to maintain the slag composition at 60-65% weight percent $Sb_2O_3$ during fuming. This operation was continued until most of the slag was consumed.

I claim:

1. A method for producing purified lead and antimony oxide, comprising:
   a. oxidizing a molten lead alloy containing more than 0.1% antimony to the extent that purified molten lead containing a maximum of 0.1% antimony and a first slag consisting essentially of lead oxide and antimony oxide are formed;
   b. separating said purified lead and said first slag;
   c. adding a reducing agent to said first slag to reduce a sufficient quantity of lead oxide to lead to thereby create a second slag consisting essentially of about 40% to 80% antimony oxide, balance essentially lead oxide;
   d. maintaining said second slag at a temperature above about 1250° F. to permit antimony oxide to fume from said second slag;
   e. periodically adding a reducing agent to said second slag to reduce a sufficient quantity of lead oxide to lead thereby maintaining said second slag at a composition of about 40% to 80% antimony oxide, balance essentially lead oxide during antimony oxide fume formation; and
   f. collecting said antimony oxide fume.

2. The method of claim 1 which further includes: removing tin, arsenic, copper, and sulfur from said molten lead alloy prior to formation of said purified lead and said first slag.

3. The method of claim 1, wherein:
said second slag is maintained at a temaperature of from about 1400° F. to 1800° F.

4. The method of claim 3, wherein:
said second slag consists essentially of about 60% to 70% antimony oxide, balance essentially lead oxide and said second slag is maintained at a temperature of from about 1500° F. to 1700° F.

5. A method for producing antimony oxide, comprising:
   a. producing a first slag consisting essentially of lead oxide and antimony oxide;
   b. adding a reducing agent to said first slag to reduce a sufficient quantity of lead oxide to lead to thereby create a second slag consisting essentially of about 40% to 80% antimony oxide, balance essentially lead oxide;
   c. maintaining said second slag at a temperature above about 1250° F. to permit antimony oxide to fume from said second slag;
   d. periodically adding a reducing agent to said second slag to reduce a sufficient quantity of lead oxide to lead to maintain said second slag at a composition of about 40% to 80% antimony oxide, balance essentially lead oxide during antimony oxide fume formation; and
   e. collecting said antimony oxide fume.

6. The method of claim 5, wherein:
said second slag is maintained at a temperature of from about 1400° F. to 1800° F.

7. The method of claim 6, wherein:
said second slag consists essentially of about 60% to 70% antimony oxide, balance essentially lead oxide and said second slag is maintained at a temperature of from about 1500° F. to 1700° F.

* * * * *